United States Patent
Hayashi et al.

(10) Patent No.: US 8,534,162 B2
(45) Date of Patent: Sep. 17, 2013

(54) DRIVE UNIT FOR HYBRID VEHICLE

(75) Inventors: Yosuke Hayashi, Toyota (JP); Kan Sasaki, Nagoya (JP); Takeharu Koide, Toyota (JP); Akemi Okawa, Aichi-ken (JP)

(73) Assignees: Aisin AI Co., Ltd., Aichi-ken (JP); Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/524,278

(22) Filed: Jun. 15, 2012

(65) Prior Publication Data

US 2012/0318099 A1 Dec. 20, 2012

(30) Foreign Application Priority Data

Jun. 20, 2011 (JP) ................................. 2011-136624

(51) Int. Cl.
*F16H 37/06* (2006.01)

(52) U.S. Cl.
USPC ......... 74/661; 74/665 R; 74/665 A; 74/665 B

(58) Field of Classification Search
USPC .................... 74/661, 665 R, 665 A, 665 B
See application file for complete search history.

(56) References Cited

U.S. PATENT DOCUMENTS

| 3,108,660 | A | * | 10/1963 | Smith | ........................... 188/271 |
| 3,260,130 | A | * | 7/1966 | Pitts | ........................... 74/606 R |
| 3,442,153 | A | * | 5/1969 | Ross | ............................... 477/69 |
| 2006/0111216 | A1 | | 5/2006 | Ikeda | |

FOREIGN PATENT DOCUMENTS

| EP | 0 444 467 | 9/1991 |
| EP | 0 510 582 | 10/1992 |
| EP | 1 203 683 | 5/2002 |
| FR | 2 912 696 | 8/2008 |
| JP | 2006-290187 | 10/2006 |

OTHER PUBLICATIONS

Extended European Search Report dated on Oct. 4, 2012.

* cited by examiner

*Primary Examiner* — Ha D Ho
(74) *Attorney, Agent, or Firm* — IP & T Group LLP

(57) ABSTRACT

A drive unit for a hybrid vehicle includes an engine mounted on a front portion of a vehicle, a motor mounted on the front portion of the vehicle, a transmission mounted on a rear portion of the vehicle, an auxiliary transmission connected to an output shaft of the engine and to an output shaft of the motor, and a connecting shaft connecting an output shaft of the auxiliary transmission to the transmission, wherein the motor is arranged to be closer to a rear portion of the auxiliary transmission than to a front portion of the auxiliary transmission in a front/rear direction of the vehicle and to be below the connecting shaft.

5 Claims, 2 Drawing Sheets

_US 8,534,162 B2_

DRIVE UNIT FOR HYBRID VEHICLE

CROSS REFERENCE TO RELATED APPLICATIONS

This application is based on and claims priority under 35 U.S.C. §119 to Japanese Patent Application 2011-136624, filed on Jun. 20, 2011, the entire content of which is incorporated herein by reference.

TECHNICAL FIELD

This disclosure generally relates to a drive unit for a hybrid vehicle.

BACKGROUND DISCUSSION

A known hybrid vehicle, which is mounted with an engine and a generator-motor that serve as drive units, and in which an improvement of fuel efficiency, a high output and an environmental protection are realized by taking advantage of each of the engine and the generator-motor, is in practically in use. According to the aforementioned type of the hybrid vehicle, it is pointed out that a weight distribution of the vehicle between front/rear portions thereof is not well-balanced and thus an operational stability may be reduced in a case where the engine, the generator-motor and a transmission are mounted on a front portion or a rear portion of the vehicle in a concentrated manner. On the other hand, on some of FR (front-engine/rear-drive) type vehicles where the engine is mounted on the front portion of the vehicle and rear wheels are driven via a propeller shaft, a transmission is mounted on the rear portion of the vehicle. This is for a purpose of improving the operational stability during high speed driving of, for example, a sports car, in consideration of the weight distribution of the vehicle between the front/rear portions thereof.

An example of a known drive unit is disclosed in JP2006-290187A (hereinafter referred to as Patent reference 1). According to the known drive unit disclosed in the Patent reference 1, the aforementioned techniques are combined with each other so that the imbalance of the weight distribution between the front/rear portions of the vehicle is reduced even in case of the hybrid vehicle. According to the known drive unit for the hybrid vehicle disclosed in the Patent reference 1, an engine is mounted on one of a front portion and a rear portion of the vehicle, a transmission is mounted on the other one of the front portion and the rear portion of the vehicle, and a motor is arranged either closer to the engine or closer to the transmission. Accordingly, the weight distribution between the front/rear portions of the vehicle is not as imbalanced so as to be regarded as a problem, and thus a possibility of a reduction in the operational stability is eliminated.

According to the Patent reference 1, the motor is arranged either closer to the engine or closer to the transmission, however, it is not easy to actually secure a mounting space. For example, in a case where the motor is additionally mounted on the conventional FR type vehicle where the transmission is mounted on the rear portion of the vehicle, there may be a need for a significant change in many peripheral parts and components in order to secure the mounting space, which tends to increase labor and/or costs. Further, an arrangement of the motor and/or a drive path to the transmission is restricted, and thus an efficiency of the motor and/or an efficiency of a power transmission may be reduced.

A need thus exists for a drive unit for a hybrid vehicle, which is not susceptible to the drawback mentioned above.

SUMMARY

According to an aspect of this disclosure, a drive unit for a hybrid vehicle includes an engine mounted on a front portion of a vehicle, a motor mounted on the front portion of the vehicle, a transmission mounted on a rear portion of the vehicle, an auxiliary transmission connected to an output shaft of the engine and to an output shaft of the motor, and a connecting shaft connecting an output shaft of the auxiliary transmission to the transmission, wherein the motor is arranged to be closer to a rear portion of the auxiliary transmission than to a front portion of the auxiliary transmission in a front/rear direction of the vehicle and to be below the connecting shaft.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
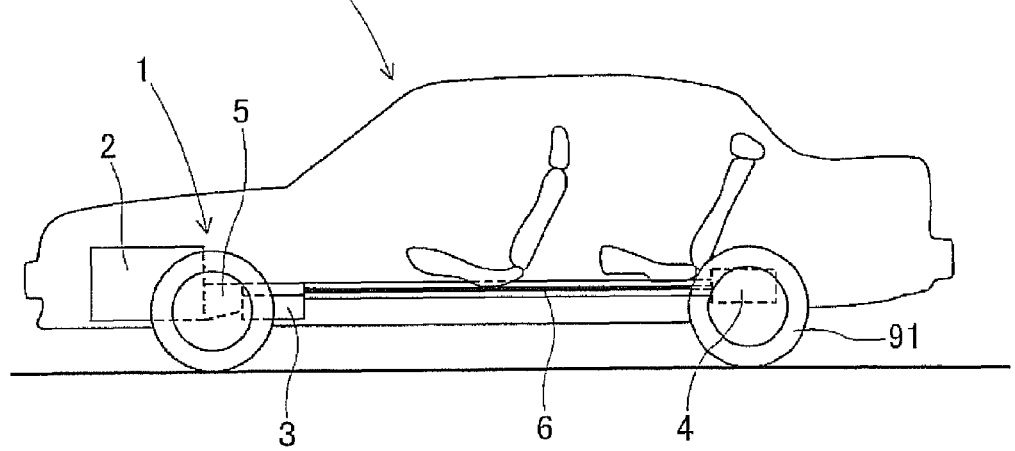
FIG. 1 is a side view illustrating an entire vehicle mounted with a drive unit for a hybrid vehicle according to a first embodiment disclosed here.

A first embodiment of this disclosure will be explained with reference to FIGS. 1 and 2. As illustrated in FIGS. 1 and/or 2, a drive unit 1 for a hybrid vehicle of the first embodiment includes an engine 2 and a generator-motor 3 (i.e., a motor) both of which are mounted on a front portion of a vehicle 9, a transmission 4 mounted on a rear portion of the vehicle 9, a speed reduction device 5 (i.e., an auxiliary transmission) connected to an output shaft 21 of the engine 2 and to an output shaft of the generator-motor 3, and a connecting shaft 6 connecting an output shaft 55 of the speed reduction device 5 to the transmission 4, and thus the drive unit 1 for the hybrid vehicle is structured to drive a driving rear wheel 91. In the first embodiment, the engine 2 and the generator-motor 3 are coaxially arranged one behind the other, or in tandem. Because the transmission 4 is mounted on the rear portion of the vehicle 9, instead of the front portion thereof, a weight distribution of the vehicle 9 between the front/rear portions thereof, that is, the weight distribution in a front/rear direction, is well-balanced, and thus a high stability is assured.

Figure 2:
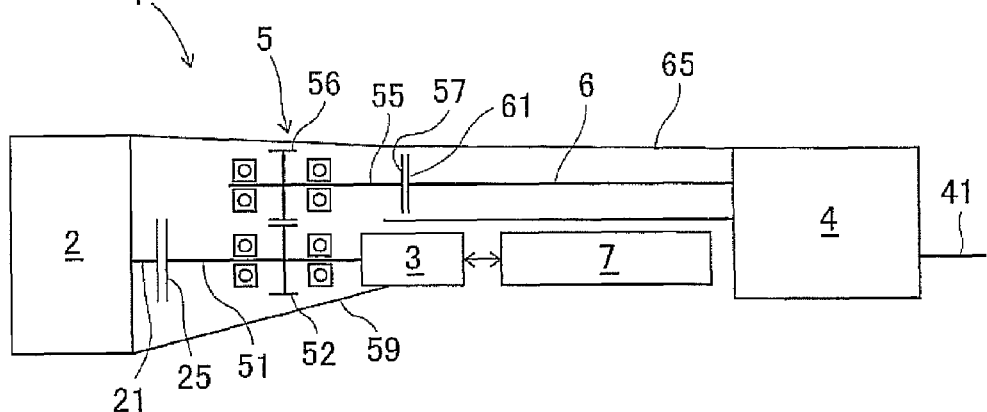
FIG. 2 is a side view schematically explaining the drive unit for the hybrid vehicle according to the first embodiment.

In FIG. 2, the left side and the right side correspond to the front portion and the rear portion of the vehicle 9, respectively. The up/down direction in FIG. 2 corresponds to an up/down direction of the vehicle 9. In addition to the structure illustrated in FIG. 1, the drive unit 1 for the hybrid vehicle of the first embodiment is provided with a hybrid unit 7 which is configured by, for example, an electric power conversion device and a battery, and in which electric power is exchanged between the hybrid unit 7 and the generator-motor 3. The hybrid unit 7 may also include a drive control device. In second and third embodiments each of which will be described later, the same reference numerals as in the first embodiment designate portions which have identical functions and operations to those in the first embodiment.

The output shaft 21 of the engine 2 is connected to an input shaft 51 of the speed reduction device 5 via a clutch 25. The output shaft of the generator-motor 3 is integrated with the input shaft 51 of the speed reduction device 5. The speed reduction device 5 corresponds to the auxiliary transmission, and is structured so that a drive gear 52 fixedly coupled to the input shaft 51 meshes at a predetermined speed reducing ratio with a driven gear 56 fixedly coupled to the output shaft 55 so as to transfer power. A connecting flange 57 is provided at a rear end portion of the output shaft 55 of the speed reduction device 5, and a connecting flange 61 is provided at a front end portion of the connecting shaft 6. The connecting flange 57 and the connecting flange 61 are connected to each other. The connecting shaft 6 is formed integrally with an input shaft of the transmission 4. In addition, a torque tube 65 accommodating and protecting the connecting shaft 6 is provided, and thus rigidity of the drive unit 1 is improved by the torque tube 65. An output shaft 41 of the transmission 4 is configured to transfer the power to the driving rear wheel 91 via a differential device.

As illustrated in FIG. 2, the generator-motor 3 is arranged to extend from a rear portion of the speed reduction device 5 in a front/rear direction of the vehicle 9 to a space below the torque tube 65. Part of the generator-motor 3 is incorporated in a case 59 of the speed reduction device 5. Further, the hybrid unit 7 is arranged below the torque tube 65 behind the generator-motor 3 in the front/rear direction of the vehicle 9.

According to the drive unit 1 for the hybrid vehicle of the first embodiment, a dead space below the torque tube 65 is effectively used as mounting spaces for the generator-motor 3 and the hybrid unit 7, and thus the mounting spaces for the generator-motor 3 and the hybrid unit 7 are easily secured, thereby saving space. At the same time, by adding minor design changes to minimal peripheral parts and components, a conventional FR (front-engine/rear-drive) type vehicle is converted into a hybrid vehicle with slight labor and costs. Further, the output shaft 21 of the engine 2 is configured to be disconnected from the input shaft 51 of the speed reduction device 5 by the clutch 25. Further, the generator-motor 3 and the speed reduction device 5 are directly connected with each other, thereby generating no power loss, which allows a high transmitting efficiency.

Figure 3:
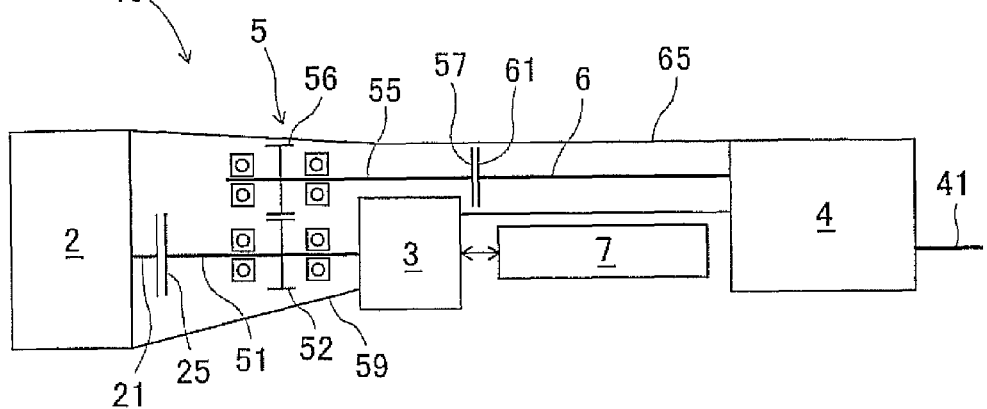
FIG. 3 is a side view schematically explaining a drive unit for a hybrid vehicle according to a second embodiment disclosed here, in which an arrangement of a generator-motor is different from that of the first embodiment.

Next, the second embodiment of this disclosure will be explained with reference to FIG. 3, focusing on constructions that are different from the first embodiment. In the second embodiment, arrangement of the generator-motor 3 is different from that of the first embodiment. As illustrated in FIG. 3, according to a drive unit 10 for a hybrid vehicle of the second embodiment, the generator-motor 3 is arranged to be closer to the rear portion of the speed reduction device 5 than to the front portion of the speed reduction device 5, and to be positioned at a lower portion of the speed reduction device 5 and to be forward relative to the torque tube 65, and a large part of the generator-motor 3 is incorporated in the case 59 of the speed reduction device 5.

According to the drive unit 10 for the hybrid vehicle of the second embodiment, because the generator-motor 3 is supported at the case 59 of the speed reduction device 5, there is no need to additionally provide a supporting member, and the arrangement of the generator-motor 3 is not restricted by the torque tube 65. Accordingly, the generator-motor 3 having a larger diameter may be mounted.

Figure 4:
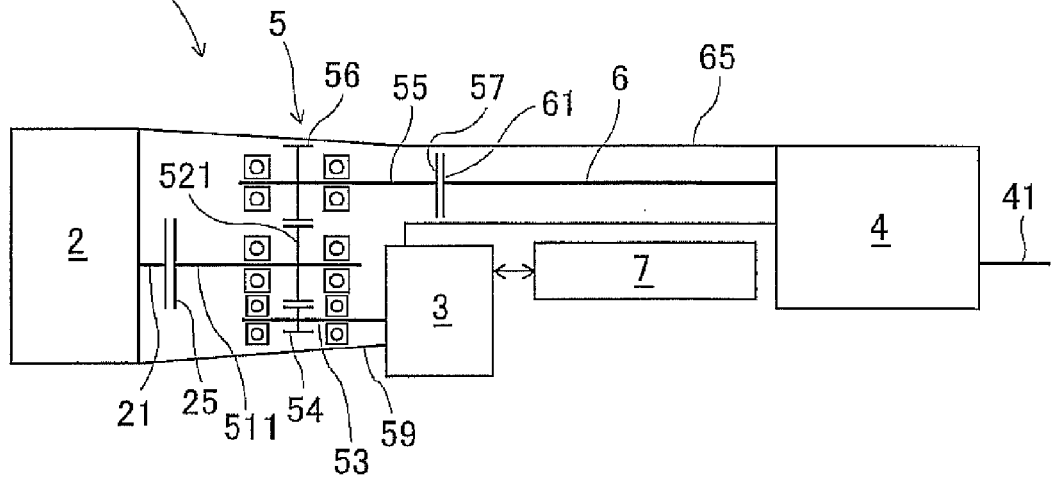
FIG. 4 is a side view schematically explaining a drive unit for a hybrid vehicle according to a third embodiment disclosed here, in which a speed reduction device includes two input shafts.

Next, the third embodiment of this disclosure will be explained with reference to FIG. 4, focusing on constructions that are different from the first and second embodiments. As illustrated in FIG. 4, according to a drive unit 11 for a hybrid vehicle of the third embodiment, the speed reduction device 5 includes two input shafts, that is, a first input shaft 511 and a second input shaft 53. The output shaft 21 of the engine 2 is connected to the first input shaft 511 via the clutch 25. The output shaft of the generator-motor 3 is integrated with the second input shaft 53 of the speed reducing device 5. The speed reduction device 5 is structured so that a first drive gear 521 fixedly coupled to the first input shaft 511 meshes at a predetermined engine-side speed reducing ratio with the driven gear 56 fixedly coupled to the output shaft 55 so as to transfer power. Further, a second drive gear 54 fixedly coupled to the second input shaft 53 meshes with the first drive gear 521 of the first input shaft 511. Accordingly, the generator-motor 3 is configured to drive the driven gear 56 and the output shaft 55 from the second drive gear 54 of the second input shaft 53 via the first drive gear 521.

According to the drive unit 11 for the hybrid vehicle of the third embodiment, a motor-side speed reducing ratio may be defined independent from the engine-side speed reducing ratio by setting the number of teeth of the second drive gear 54 freely. Consequently, the motor-side speed reducing ratio which is optimally suited for motor-driven driving is set, and thus a high efficiency of the motor is obtained. In addition, because the second input shaft 53 is arranged below the first input shaft 511 as illustrated in FIG. 4, the generator-motor 3 is arranged to be lower than the engine 2, that is, part of the generator-motor 3 is positioned lower than the engine 2, which lowers the center of gravity of the drive unit 11 and improves a vehicle stability. In addition, the generator-motor 3 is arranged away from the torque tube 65, which provides an effect that the generator-motor 3 having the larger diameter may be mounted.

In the third embodiment, the generator-motor 3 is configured to drive the driven gear 56 from the second drive gear 54 via the first drive gear 521, however, the configuration of the generator-motor 3 is not limited thereto. Specifically, the first input shaft 511 and the second input shaft 53 may be arranged in a manner that the generator-motor 3 drives the driven gear 56 directly from the second drive gear 54.

According to the first to third embodiments, the drive unit 1, 10, 11 for the hybrid vehicle includes the engine 2 mounted on the front portion of the vehicle 9, the generator-motor 3 mounted on the front portion of the vehicle 9, the transmission 4 mounted on the rear portion of the vehicle 9, the speed reduction device 5 connected to the output shaft 21 of the engine 2 and to the output shaft of the generator-motor 3, and the connecting shaft 6 connecting the output shaft 55 of the speed reduction device 5 to the transmission 4, wherein the generator-motor 3 is arranged to be closer to the rear portion of the speed reduction device 5 than to the front portion of the speed reduction device 5 in the front/rear direction of the vehicle 9 and to be below the connecting shaft 6.

According to the above described structure, the generator-motor 3 is arranged to be closer to the rear portion of the speed reduction device 5 than to the front portion of the speed reduction device 5 in the front/rear direction of the vehicle 9 and to be below the connecting shaft 6. Thus, the dead space below the connecting shaft 6 or below the torque tube 65 accommodating therein the connecting shaft 6 is used as the mounting space for the generator-motor 3, and thus the mounting space for the generator-motor 3 is easily secured, thereby saving space. At the same time, by adding the minor design changes to the minimal peripheral parts and components, the conventional FR type vehicle is converted into the hybrid vehicle with the slight labor and costs.

According to the first and second embodiments, the engine 2 and the generator-motor 3 are arranged coaxially in tandem, the output shaft 21 of the engine 2 is connected to the input shaft 51 of the speed reduction device 5 via the clutch 25, and the output shaft of the generator-motor 3 is integrated with the input shaft 51 of the speed reduction device 5.

According to the above described structure, the engine 2 and the generator-motor 3 are arranged coaxially in tandem, the output shaft 21 of the engine 2 is connected to the input shaft 51 of the speed reduction device 5 via the clutch 25, and the output shaft of the generator-motor 3 is integrated with the input shaft 51 of the speed reduction device 5. Consequently, the output shaft 21 of the engine 2 is configured to be disconnected from the input shaft 51 of the speed reduction device 5 by the clutch 25 during the motor-driven driving. Further, the generator-motor 3 and the speed reduction device 5 are directly connected with each other, thereby generating no power loss, which brings the high transmitting efficiency.

According to the third embodiment, the speed reduction device 5 includes the first input shaft 511 and the second input shaft 53, the output shaft 21 of the engine 2 is connected to the first input shaft 511 of the speed reduction device 5 via the clutch 25, and the output shaft of the generator-motor 3 is integrated with the second input shaft 53 of the speed reduction device 5.

According to the above described structure, the speed reduction device 5 includes the first input shaft 511 and the second input shaft 53, the output shaft 21 of the engine 2 is connected to the first input shaft 511 of the speed reduction device 5 via the clutch 25, and the output shaft of the generator-motor 3 is integrated with the second input shaft 53 of the speed reduction device 5. Consequently, the motor-side speed reducing ratio inside the speed reduction device 5 may be set freely independent from the engine-side speed reducing ratio. Consequently, the motor-side speed reducing ratio which is optimally suited for the motor-driven driving is set, and thus the high efficiency of the motor is obtained.

According to the first to third embodiments, at least the part of the generator-motor 3 is incorporated in the case 59 constituting the speed reduction device 5.

According to the above described structure, at least the part of the generator-motor 3 is incorporated in the case 59 constituting the speed reduction device 5. Consequently, a member supporting the generator-motor 3 does not interfere with the case 59 of the speed reduction device 5, and thus the generator-motor 3 having the larger diameter may be mounted.

According to the first and third embodiments, at least the part of the generator-motor 3 is arranged below the torque tube 65 accommodating the connecting shaft 6.

According to the first to third embodiments, the generator-motor 3 is the generator-motor being capable of generating electric power, and at least one of the electric power conversion device, the battery and the drive control device is arranged behind the generator-motor 3 in the front/rear direction of the vehicle 9.

According to the above described structure, at least one of the electric power conversion device, the battery and the drive control device is arranged behind the generator-motor 3 in the front/rear direction of the vehicle 9. Consequently, the dead space below the connecting shaft 6 or below the torque tube 65 accommodating therein the connecting shaft 6 is used as the mounting spaces for the generator-motor 3, the battery or the drive control device, and thus the mounting spaces are easily secured, which saves space.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A drive unit for a hybrid vehicle, the drive unit comprising:
   an engine mounted on a front portion of a vehicle;
   a motor mounted on the front portion of the vehicle and coaxially in tandem with the engine;
   a transmission mounted on a rear portion of the vehicle;
   an auxiliary transmission connected to an output shaft of the engine and connected to an output shaft of the motor, wherein an input shaft of the auxiliary transmission is connected, via a clutch, to the output shaft of the engine, and the output shaft of the motor is integrated with the input shaft of the auxiliary transmission; and
   a connecting shaft connecting an output shaft of the auxiliary transmission to the transmission, wherein the motor is arranged to be closer to a rear portion of the auxiliary transmission than to a front portion of the auxiliary transmission in a front/rear direction of the vehicle and to be below the connecting shaft.

2. The drive unit for the hybrid vehicle according to claim 1, wherein the auxiliary transmission includes a first input shaft and a second input shaft, the output shaft of the engine is connected to the first input shaft of the auxiliary transmission via the clutch, and the output shaft of the motor is integrated with the second input shaft of the auxiliary transmission.

3. The drive unit for the hybrid vehicle according to claim 1, wherein at least part of the motor is incorporated in a case constituting the auxiliary transmission.

4. The drive unit for the hybrid vehicle according to claim 1, wherein at least part of the motor is arranged below a torque tube accommodating the connecting shaft.

5. A drive unit for a hybrid vehicle, the drive unit comprising:
   an engine mounted on a front portion of a vehicle;
   a motor mounted on the front portion of the vehicle, wherein the motor is a generator-motor being capable of generating electric power, and at least one of an electric power conversion device, a battery and a drive control device is arranged behind the generator-motor in the front/rear direction of the vehicle;
   a transmission mounted on a rear portion of the vehicle;
   an auxiliary transmission connected to an output shaft of the engine and to an output shaft of the motor; and
   a connecting shaft connecting an output shaft of the auxiliary transmission to the transmission, wherein the motor is arranged to be closer to a rear portion of the auxiliary transmission than to a front portion of the auxiliary transmission in a front/rear direction of the vehicle and to be below the connecting shaft.

* * * * *